United States Patent
Gao et al.

(10) Patent No.: US 12,223,947 B2
(45) Date of Patent: Feb. 11, 2025

(54) DECODING NETWORK CONSTRUCTION METHOD, VOICE RECOGNITION METHOD, DEVICE AND APPARATUS, AND STORAGE MEDIUM

(71) Applicant: IFLYTEK CO., LTD., Anhui (CN)

(72) Inventors: Jianqing Gao, Anhui (CN); Zhiguo Wang, Anhui (CN); Guoping Hu, Anhui (CN)

(73) Assignee: IFLYTEK CO., LTD., Anhui (CN)

(*) Notice: Subject to any disclaimer, the term of this patent is extended or adjusted under 35 U.S.C. 154(b) by 352 days.

(21) Appl. No.: 17/761,217

(22) PCT Filed: Dec. 12, 2019

(86) PCT No.: PCT/CN2019/124790
§ 371 (c)(1),
(2) Date: Mar. 17, 2022

(87) PCT Pub. No.: WO2021/072955
PCT Pub. Date: Apr. 22, 2021

(65) Prior Publication Data
US 2022/0375459 A1 Nov. 24, 2022

(30) Foreign Application Priority Data
Oct. 16, 2019 (CN) .......................... 201910983196.3

(51) Int. Cl.
*G10L 15/08* (2006.01)
*G10L 15/183* (2013.01)
*G10L 15/22* (2006.01)

(52) U.S. Cl.
CPC .......... *G10L 15/083* (2013.01); *G10L 15/183* (2013.01); *G10L 15/22* (2013.01)

(58) Field of Classification Search
CPC ...... G10L 15/083; G10L 15/183; G10L 15/22
See application file for complete search history.

(56) References Cited

U.S. PATENT DOCUMENTS 9,460,088 B1    10/2016    Sak et al.
10,115,393 B1 *    10/2018    Kumar .................... G10L 15/16
(Continued)

FOREIGN PATENT DOCUMENTS

CA    3082402 A1 *    5/2019    .......... G06F 40/216
CN    103065630 A    4/2013
(Continued)

OTHER PUBLICATIONS

European Search Report issued in EP Application No. 19949233, mailed Oct. 13, 2023, 8 pages.
(Continued)

*Primary Examiner* — Paras D Shah
*Assistant Examiner* — Oluwadamilola M Ogunbiyi
(74) *Attorney, Agent, or Firm* — Zhong Law, LLC (57) ABSTRACT

A method for constructing a decoding network, a speech recognition method, a device, an apparatus, and a storage medium are provided. The method for constructing a decoding network includes: acquiring a general language model, a domain language model, and a general decoding network generated based on the general language model; generating a domain decoding network based on the domain language model and the general language model; and integrating the domain decoding network with the general decoding network to obtain a target decoding network. The speech recognition method includes: decoding to-be-recognized speech data by using a target decoding network to obtain a decoding path for the to-be-recognized speech data; and determining a speech recognition result for the to-be-recognized speech data based on the decoding path for the to-be-recognized speech data.

14 Claims, 5 Drawing Sheets

(56) References Cited

U.S. PATENT DOCUMENTS

| | | | |
|---|---|---|---|
| 10,402,493 B2* | 9/2019 | Spencer | G06F 40/274 |
| 2004/0138888 A1 | 7/2004 | Ramabadran | |
| 2012/0053935 A1 | 3/2012 | Malegaonkar et al. | |
| 2014/0236591 A1* | 8/2014 | Yue | G10L 15/083 |
| | | | 704/230 |
| 2015/0348542 A1 | 12/2015 | Pan et al. | |
| 2017/0092266 A1 | 3/2017 | Wasserblat et al. | |
| 2018/0204565 A1 | 7/2018 | Cohen et al. | |
| 2018/0277103 A1 | 9/2018 | Wu et al. | |
| 2019/0005947 A1* | 1/2019 | Kim | G10L 15/22 |
| 2019/0122651 A1* | 4/2019 | Arik | G10L 13/08 |
| 2019/0172466 A1* | 6/2019 | Lee | G06F 40/58 |
| 2019/0189115 A1 | 6/2019 | Hori et al. | |
| 2019/0279618 A1* | 9/2019 | Yadav | G06F 40/30 |
| 2019/0279646 A1* | 9/2019 | Tian | G10L 15/20 |
| 2019/0318725 A1* | 10/2019 | Le Roux | G10L 15/16 |
| 2020/0020319 A1* | 1/2020 | Malhotra | G10L 15/26 |
| 2020/0135174 A1* | 4/2020 | Cui | G10L 25/03 |

FOREIGN PATENT DOCUMENTS

| | | | |
|---|---|---|---|
| CN | 103077708 A | | 5/2013 |
| CN | 103700369 A | | 4/2014 |
| CN | 104064184 A | | 9/2014 |
| CN | 104282301 A | | 1/2015 |
| CN | 106294460 A | | 1/2017 |
| CN | 108305634 A | | 7/2018 |
| CN | 108538285 A | | 9/2018 |
| CN | 108932944 A | | 12/2018 |
| CN | 110120221 A | | 8/2019 |
| CN | 110322884 A | | 10/2019 |
| CN | 110428819 B | * | 11/2020 |
| RU | 2366007 C2 | | 8/2009 |
| WO | 2014117577 A1 | | 8/2014 |
| WO | 2014183373 A1 | | 11/2014 |
| WO | WO-2017114172 A1 | * | 7/2017 |
| WO | 2019103936 A1 | | 5/2019 |
| WO | 2019116604 A1 | | 6/2019 |

OTHER PUBLICATIONS

International Search Report and Written Opinion issued in PCT/CN2019/124790 mailed Jul. 1, 2020, 18 pages.
Guo et al., "Optimized Large Vocabulary WFST Speech Recognition System" IEEE, 2012, pp. 1243-1247.
Nanjing University of Science & Technology, Research on Chinese Speech:, 2012, pp. 1-68.
Russian First Office Action issued in 2022108762/28(018248) mailed Dec. 12, 2022, 20 pages.

* cited by examiner

DECODING NETWORK CONSTRUCTION METHOD, VOICE RECOGNITION METHOD, DEVICE AND APPARATUS, AND STORAGE MEDIUM

This application is a national phase application of PCT international patent application PCT/CN2019/124790, filed on Dec. 12, 2019, which claims priority to Chinese Patent Application No. 201910983196.3, titled "DECODING NETWORK CONSTRUCTION METHOD, VOICE RECOGNITION METHOD, DEVICE AND APPARATUS, AND STORAGE MEDIUM", filed on Oct. 16, 2019 with the China National Intellectual Property Administration, both of which are incorporated herein by reference in their entireties.

TECHNICAL FIELD

The present disclosure relates to the technical field of speech recognition, and in particular to a method for constructing a decoding network, a speech recognition method, a device thereof, an apparatus thereof, and a storage medium.

BACKGROUND

Speech recognition is implemented using a language model, and most of the existing speech recognition schemes are based on a universal language model. In a recognition scheme based on the universal language model, the universal language model is first converted into a general decoding network, and the speech to be recognized is decoded by applying the general decoding network.

The recognition scheme based on a universal language model can accurately recognize a general word, but is possible to recognize a professional word of a specific domain as a general word having similar pronunciation with the profession term. In other words, the conventional recognition scheme based on a universal language model may have a low recognition accuracy for domain specific terms.

SUMMARY

In view of the above, a method for constructing a decoding network, a speech recognition method, a device, an apparatus, and a storage medium are provided in the present disclosure, in order to improve accuracy in recognizing domain specific terms. Technical solutions are described as follows.

A method for constructing a decoding network is provided. The method includes: acquiring a universal language model, a domain language model, and a general decoding network generated based on the universal language model; generating a domain decoding network based on the domain language model and the universal language model; and integrating the domain decoding network with the general decoding network to obtain a target decoding network.

Optionally, the generating a domain decoding network based on the domain language model and the universal language model includes: performing interpolation on the universal language model and the domain language model, where a part on which the interpolation is performed includes all parts in the domain language model and a part in the universal language model which also appears in the domain language model; and generating the domain decoding network based on the part on which the interpolation is performed.

Optionally, the integrating the domain decoding network with the general decoding network to obtain a target decoding network includes: cascading the domain decoding network and the general decoding network to obtain the target decoding network.

Optionally, the cascading the domain decoding network and the general decoding network includes: adding virtual nodes for each of the general decoding network and the domain decoding network, where the virtual nodes include a start node and an end node; and cascading the general decoding network and the domain decoding network by means of the start node and the end node.

Optionally, the cascading the general decoding network and the domain decoding network by means of the start node and the end node includes: directionally connecting the end node for the general decoding network and the start node for the domain decoding network in a direction from the end node for the general decoding network to the start node for the domain decoding network; and directionally connecting the end node for the domain decoding network and the start node for the general decoding network in a direction from the end node for the domain decoding network to the start node for the general decoding network.

A speech recognition method is provided. The method includes: decoding to-be-recognized speech data by using a target decoding network to obtain a decoding path for the to-be-recognized speech data, where the target decoding network is constructed by using the method for constructing a decoding network described above; and determining a speech recognition result for the to-be-recognized speech data based on the decoding path for the to-be-recognized speech data.

Optionally, the determining a speech recognition result for the to-be-recognized speech data based on the decoding path for the to-be-recognized speech data includes: determining the speech recognition result for the to-be-recognized speech data based on a high-ordered language model obtained in advance and the decoding path for the to-be-recognized speech data, where the high-ordered language model is obtained by performing interpolation on the universal language model by using the domain language model.

Optionally, a process of decoding to-be-recognized speech data by using a target decoding network to obtain a decoding path for the to-be-recognized speech data includes: inputting speech frames of the to-be-recognized speech data into the target decoding network sequentially for decoding, to obtain the decoding path for the to-be-recognized speech data, where the speech frames of the to-be-recognized speech data enter, respectively via two start nodes in the target decoding network, into the general decoding network and the domain decoding network in the target decoding network for decoding, and in a case where a candidate decoding path in the general decoding network or the domain decoding network includes an end node, the process jumps from the end node to at least one start node connected to the end node, entering the general decoding network and/or the domain decoding network to continue decoding until an end of the speech frames.

A device for constructing a decoding network is provided. The device includes: a language model and general decoding network acquisition module configured to acquire a universal language model, a domain language model, and a general decoding network generated based on the universal language model; a domain decoding network generation module configured to generate a domain decoding network based on the universal language model and the domain language model; and a decoding network integration module configured to integrate the domain decoding network with the general decoding network to obtain a target decoding network.

Optionally, the domain decoding network generation module includes: an interpolation sub-module configured to perform interpolation on the universal language model and the domain language model, where a part on which the interpolation is performed includes all parts in the domain language model and a part in the universal language model which also appears in the domain language model; and a domain decoding network generation sub-module configured to generate the domain decoding network based on the part on which the interpolation is performed.

Optionally, the decoding network integration module is configured to cascade the domain decoding network and the general decoding network to obtain the target decoding network.

A speech recognition device is provided. The device includes: a decoding module configured to decode to-be-recognized speech data by using a target decoding network to obtain a decoding path for the to-be-recognized speech data, where the target decoding network is constructed by the device for constructing a decoding network described above; and a speech recognition result determination module configured to determine a speech recognition result for the to-be-recognized speech data based on the decoding path for the to-be-recognized speech data.

An apparatus for constructing a decoding network is provided. The apparatus includes: a memory configured to store a program; and a processor configured to execute the program to perform the method for constructing a decoding network described above.

A readable storage medium is provided. The storage medium stores a computer program, where the computer program, when being executed by a processor, causes the processor to perform the method for constructing a decoding network described above.

A speech recognition apparatus is provided. The apparatus includes: a memory configured to store a program; and a processor configured to execute the program to perform the speech recognition method described above.

A readable storage medium is provided. The storage medium stores a computer program, where the computer program, when being executed by a processor, causes the processor to perform the speech recognition method described above.

It can be seen from the above solutions that in the method for constructing a decoding network provided in the present disclosure, a domain decoding network may be generated based on a universal language model and a domain language model, and the domain decoding network is then integrated with the general decoding network to obtain a target decoding network. With the method for constructing a decoding network provided by the present disclosure, the target decoding network obtained by integrating the domain decoding network with the general decoding network may accurately recognize both a general word and a domain specific term. Compared with the conventional speech recognition method based on a universal language model, the method in the present disclosure significantly improves the accuracy of speech recognition for a domain specific term. In addition, the method for constructing a decoding network in the present disclosure can quickly construct the target decoding network. The method for constructing a decoding network in the present disclosure can efficiently construct the target decoding network that accurately recognizes a domain specific term, which leads to a more accurate speech recognition result in performing, based on the target decoding network, speech recognition on a speech containing a domain specific term.

DETAILED DESCRIPTION

The technical solutions in the embodiments of the present disclosure are clearly and completely described in the following with reference to the accompanying drawings in the embodiments of the present disclosure. Apparently, the embodiments described herein are only a part rather than all of the embodiments of the present disclosure. Any other embodiments obtained by those skilled in the art based on the embodiments in the present disclosure without any creative work fall within the protection scope of the present disclosure.

The present disclosure generally relates to a speech recognition system for speech recognition. The speech recognition system may receive a speech inputted by a user, and recognize, by using a decoding network, the speech inputted by the user into a text and output the text. In one of the implementations, the speech recognition system may be implemented on a terminal device. In a basic configuration, the terminal device has an input element (such as a microphone, a sensor, a touch screen, a button) and an output element (such as a display screen, a speaker). The terminal device may be a computing device suitable for speech recognition, such as a smartphone, a tablet computer, a notebook computer, a personal computer, a smart watch, a wearable device, a TV, and a game device. A speech is inputted by a user through the input element (such as a microphone) of the terminal device. The speech inputted by the user is recognized by the terminal device by using a decoding network, and an obtained result of the speech recognition is outputted through the output element. In addition to the input element and the output element, the terminal device further includes a processor and a memory which communicate with each other via a communication bus. The processor may be a central processing unit CPU and/or graphics processing unit GPU, a general-purpose processor, a digital signal processor (DSP), an application specific integrated circuit (ASIC), a field programmable gate array (FPGA) or any other programmable logic device, discrete gate or transistor logic device. The general-purpose processor may be a microprocessor or any conventional processor. The memory may include a computer storage medium in a form of volatile and/or non-volatile memory, such as a read-only memory (ROM), a random access memory (RAM). The memory has a program stored thereon, which may be invoked by the processor.

In another one of the implementations, the speech recognition system may be implemented on a server, and the server may receive data provided from the terminal device through a network, and may further provide data to the terminal device through the network. The speech recognition system may also be implemented on multiple servers, and similar to the above, the servers may receive data provided from the terminal device through the network and provide data to the terminal device through the network. The network may be, but is not limited to, a local area network (LAN), a wide area network (WAN), and the like. In a case where the speech recognition system is implemented on the server, the terminal device obtains the speech inputted by the user through an input device of the terminal device, and transmits the speech to the server through the network; the server recognizes, by using a decoding network, the speech received from the terminal device to obtain a speech recognition result, and output the speech recognition result to the terminal device through the network; and the terminal device outputs the speech recognition result through the output element. The server may include a processor and a memory, which communicate with each other via a communication bus. The processor may be a central processing unit CPU and/or graphics processing unit GPU, a general-purpose processor, a digital signal processor (DSP), an application specific integrated circuit (ASIC), a field programmable gate array (FPGA) or any other programmable logic device, discrete gate or transistor logic device, discrete hardware component. The general-purpose processor may be a microprocessor or any conventional processor. The memory may include a computer storage medium in a form of volatile and/or non-volatile memory, such as a read-only memory (ROM), a random access memory (RAM). The memory has a program stored thereon, which may be invoked by the processor.

Considering that the speech recognition system may obtain a low recognition effect when recognizing a speech containing a professional word in a domain by using a general decoding network, the applicants have conducted a research as follows in order to improve the accuracy in recognizing a domain specific term. Based on an initial concept, training is performed with a corpus of a specific domain to obtain a domain language model, the trained domain model is then interpolated into a universal language model, and the universal language model after interpolation is converted into a target decoding network. Alternatively, the universal language model after interpolation may be converted into a weighted finite state machine (WFST), which is used as the target decoding network. After obtaining the target decoding network, a speech recognition may be performed by using the target decoding network.

It should be noted that the universal language model may be widely used and is suitable for various common situations, and the domain language model is a language model obtained by training with words that are common in a specific field but not common in other fields. Interpolating the domain language model into the universal language model can not only maintain original knowledge of the universal language model, but also increase a probability of occurrence of a professional word that never appears in the universal language model. Therefore, by interpolating the domain language model into the universal language model, a language model suitable for a specific domain may be obtained, and the target decoding network obtained by converting such language model, when being used for speech recognition, may lead to higher recognition accuracy.

It is recognized that although the above solution may improve the accuracy of recognizing a domain specific term, there are problems as follows. After interpolating the domain language model into the universal language model, it is necessary to regenerate a decoding network, such as WFST, based on the universal language model after interpolation. Since the universal language model after interpolation has a large scale, it requires a lot of time (more than a few hours) and a lot of storage resources to generate the decoding network, therefore the solution is difficult to be applied to an industrial system.

In order to solve the problems, another solution was proposed and studied. According to the concept of this solution, a decoding network generated based on a universal language model is used as a general decoding network; a domain language model is obtained by training with a corpus of a specific domain, and a decoding network generated based on the domain language model is used as a domain decoding network; and search is performed in the general decoding network for any path existing in the domain decoding network, and a weight of such path is modified.

However, in the above solution, the search requires a long time as the path in the general decoding network is too huge. In other words, although this solution avoids the problem of consuming a lot of resources to regenerate the decoding network, it still takes a long time.

After a further study, applicants finally propose a solution that perfectly solves the above-mentioned problems in the research and development. The solution provided in the present disclosure is described through the following embodiments.

Figure 1:
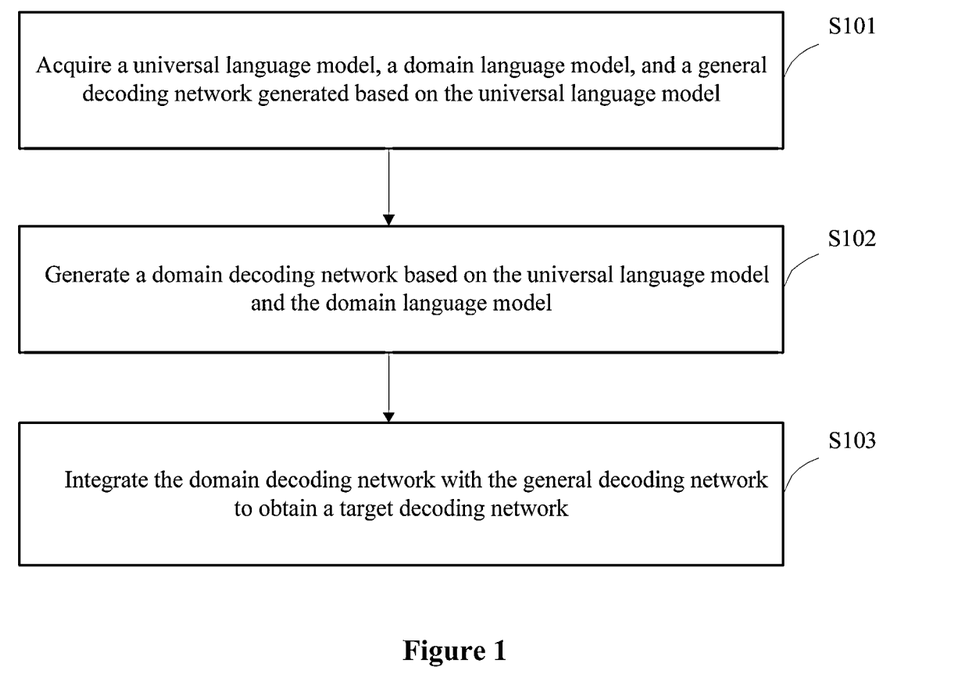
FIG. 1 is a schematic flowchart showing a method for constructing a decoding network according to an embodiment of the present disclosure.

A method for constructing a decoding network is provided according to an embodiment of the present disclosure. Referring to FIG. 1, which shows a schematic flowchart of the method for constructing a decoding network, the method may include steps S101 to S103.

In step S101, a universal language model, a domain language model, and a general decoding network generated based on the universal language model are obtained.

The domain language model is obtained by training with a corpus of a specific domain, and the general decoding network is obtained by performing a binary conversion on the universal language model.

In step S102, a domain decoding network is generated based on the universal language model and the domain language model.

It should be noted that a decoding process in a speech recognition system is essentially a comparison of scores for decoding paths. Based on this, according to the present disclosure, the domain decoding network is generated by performing interpolation on the universal language model and the domain language model. Although the domain decoding network needs to be generated, the time and storage resources consumed to generate the domain decoding network are significantly reduced compared to the time and storage resources consumed by the aforementioned "regenerating the decoding network based on the universal language model after interpolation".

A process of generating the domain decoding network based on the universal language model and the domain language model may refer to the subsequent description of the embodiments.

In step S103, the domain decoding network is integrated with the general decoding network to obtain a target decoding network.

In the method for constructing a decoding network provided by the embodiments of the present disclosure, a domain decoding network may be generated based on a universal language model and a domain language model, and the domain decoding network is integrated into the general decoding network, so that a target decoding network capable of decoding to-be-recognized speech data is obtained. With the method for constructing a decoding network provided by the embodiments of the present disclosure, the target decoding network obtained by integrating the domain decoding network with the general decoding network may accurately recognize both a general word and a domain specific term. Compared with the general decoding network, the target decoding network constructed in the embodiments of the present disclosure can improve the accuracy of speech recognition for a domain specific term. In addition, the time and storage resources consumed in generating the domain decoding network are significantly reduced compared to the time and storage resources consumed in regenerating the general decoding network.

The step S102 of generating a domain decoding network based on the universal language model and the domain language model in the foregoing embodiment is described below.

Figure 2:
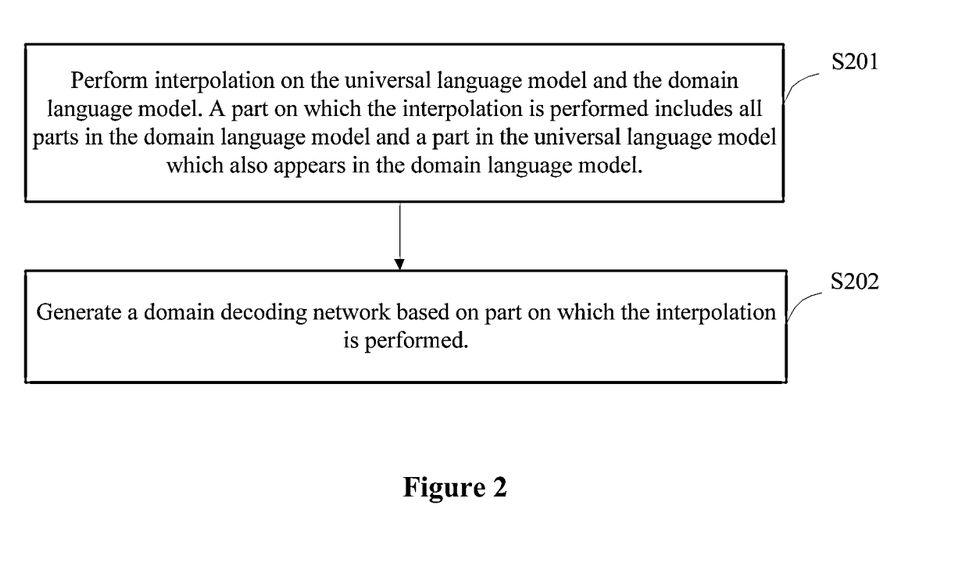
FIG. 2 is a schematic flowchart showing a process of generating a domain decoding network based on a universal language model and a domain language model in the method for constructing a decoding network according to an embodiment of the present disclosure.

Referring to FIG. 2, which shows a schematic flowchart of a process of generating a domain decoding network based on a universal language model and a domain language model, the process may include steps S201 to S202.

In step S201, interpolation is performed on the universal language model and the domain language model.

A part on which the interpolation is performed includes all parts in the domain language model and a part in the universal language model which also appears in the domain language model.

In an embodiment, the universal language model and the domain language model may each be an n-gram model. Based on this, when performing interpolation on the domain language model and the universal language model in this embodiment, the part on which the interpolation is performed includes all n-gram entries in the domain language model and a n-gram entry in the universal language model which also appears in the domain language model. In other words, the part on which the interpolation is performed includes only the n-gram entry that appears in the domain language model, and does not include any n-gram entry that does not appear in the domain language model.

It should be noted that the interpolation on the n-gram entry in the domain language model and the n-gram entry that is in the universal language model and also appears in the domain language model is in essence a probabilistic interpolation on these n-gram entries.

Assuming that the domain language model and universal language model are both third-ordered language models, a tri-gram probabilistic interpolation formula is expressed as follows:

$$p_{new}(\omega_n | \omega_{n-2}\omega_{n-1}) = \quad (1)$$

$$\alpha p_{old}(\omega_n | \omega_{n-2}\omega_{n-1}) + (1+\alpha)p_B(\omega_n | \omega_{n-2}\omega_{n-1})\omega_{n-2}\omega_{n-1}\omega_n \in DomainText$$

where $p(\omega_n|\omega_{n-2}\omega_{n-1})$ represents a probability of occurrence of $\omega_n$ under occurrence of $\omega_{n-2}$ and $\omega_{n-1}$, $p_B$ represents a probability of an n-gram entry that is in the universal language model and also appears in the domain language model, $p_{old}$ represents a probability of the n-gram entry in the domain language model, and $p_{new}$ represents a probability of the n-gram entry after interpolation is performed on the n-gram entry in the domain language model and the n-gram entry in the universal language model which also appears in the domain language model, and $\alpha$ represents an interpolation coefficient.

In step S202, a domain decoding network is generated based on the part on which the interpolation is performed.

In an embodiment, the domain decoding network is obtained by performing a binary conversion on the part on which the interpolation is performed.

Since the number of n-gram entries in the part on which the interpolation is performed (that is, the n-gram entries that only appear in the domain language model) is small, generating the domain decoding network based on the part on which the interpolation is performed consumes very little time and storage resource.

The step S103 of integrating the domain decoding network with the general decoding network to obtain a target decoding network in the foregoing embodiment is described below.

There are various ways to integrate the domain decoding network with the general decoding network.

In a possible implementation, the target decoding network may be obtained by connecting the domain decoding network and the general decoding network in parallel.

In a case of decoding to-be-recognized speech data by using the target network obtained by connecting the domain decoding network and the general decoding network in parallel, the to-be-recognized speech data is inputted into the domain decoding network and the general decoding network respectively, for decoding, to obtain a decoding path in the general decoding network and a decoding path in the domain decoding network. A score for the decoding path in the general decoding network is compared with a score for the decoding path in the domain decoding network, and the decoding path with a higher score is determined as a final decoding path. In other words, the final decoding path is either the decoding path in the domain decoding network or the decoding path in the general decoding network. Finally, a decoding result is generated based on the final decoding path.

The applicants determined after study that the target decoding network obtained by connecting the domain decoding network and the general decoding network in parallel may accurately recognize a speech containing only a general word or only a domain specific term, but the recognition accuracy is not sufficient for a speech containing both a general word and a domain specific term. It is understandable that, in some cases, the to-be-recognized speech may be a continuous speech containing a large number of words, usually including both general words and professional words. Therefore, the decoding network obtained by connecting the domain decoding network and the general decoding network in parallel is not suitable for recognizing a continuous speech that contains a large number of words.

In view of the above-mentioned problems, another implementation for integrating the domain decoding network with the general decoding network is provided in the present disclosure. A basic idea of such implementation is to cascade the domain decoding network and the general decoding network, so that a target decoding network obtained by cascading the domain decoding network and the general decoding network can accurately recognize a speech containing both a general word and a professional word, and is suitable for recognizing a continuous speech containing a large number of words.

Figure 3:
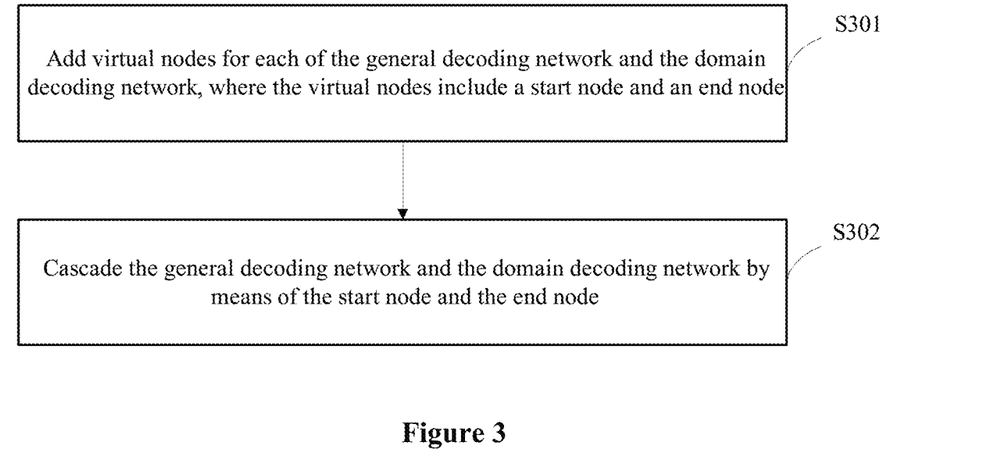
FIG. 3 is a schematic flowchart showing a process of cascading a domain decoding network and a general decoding network in the method for constructing a decoding network according to an embodiment of the present disclosure.

Referring to FIG. 3, which shows a schematic flowchart of a process of cascading the domain decoding network and the general decoding network, the process may include steps S301 to S302.

In step S301, virtual nodes are added for each of the general decoding network and the domain decoding network.

The virtual nodes include a start node and an end node.

In step S302, the general decoding network and the domain decoding network are cascaded by means of the start node and the end node.

In an embodiment, a process of cascading the general decoding network and the domain decoding network by means of the start node and the end node includes: directionally connecting the end node for the general decoding network and the start node for the domain decoding network in a direction from the end node for the general decoding network to the start node for the domain decoding network; and directionally connecting the end node for the domain decoding network and the start node for the general decoding network in a direction from the end node for the domain decoding network to the start node for the general decoding network.

Figure 4:
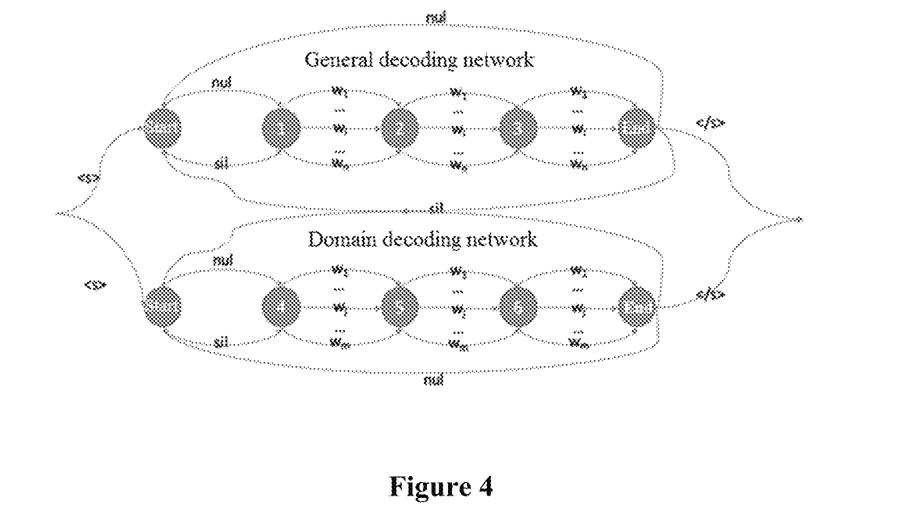
FIG. 4 is a schematic diagram showing an example of a target decoding network obtained by cascading a domain decoding network and a general decoding network according to an embodiment of the present disclosure.

Reference is made to FIG. 4, which shows a schematic diagram of a target decoding network obtained by cascading the domain decoding network and the general decoding network. As shown in FIG. 4, the general decoding network includes node 1, node 2 and node 3, and the domain decoding network includes node 4, node 5 and node 6.

In order to cascade the domain decoding network and the general decoding network, a virtual start node and a virtual end node are created for the domain decoding network, and a virtual start node and a virtual end node are created for the general decoding network. The start node created for the general decoding network and node 1 in the general decoding network are connected in a direction from the start node to node 1; node 3 in the general decoding network and the end node created for the general decoding network are connected in a direction from node 3 to the end node; the end node created for the general decoding network and the start node created for the general decoding network are connected in a direction from the end node to the start node; the start node created for the domain decoding network and node 4 in the domain decoding network are connected in a direction from the start node to node 4; node 6 in the domain decoding network and the end node created for the domain decoding network are connected in a direction from node 6 to the end node; the end node created for the domain decoding network and the start node created for the domain decoding network are connected in a direction from the end node to the start node; the end node created for the general decoding network and the start node created for the domain decoding network are connected in a direction from the end node to the start node; and the end node created for the domain decoding network and the start node created for the general decoding network are connected in a direction from the end node to the start node.

When decoding a to-be-recognized speech by using the target decoding network obtained by cascading the domain decoding network and the general decoding network, if the to-be-recognized speech data include both a general word and a professional word, a final decoding path is composed of a decoding path in the general decoding network and a decoding path in the domain decoding network. For example, the to-be-recognized speech data is "Let's start speech recognition", in which the decoding path corresponding to "Let's start" exists in the general decoding network, and the decoding path corresponding to "speech recognition" exists in the domain decoding network, then the final decoding path is composed of the decoding path corresponding to "Let's start" and the decoding path corresponding to "speech recognition". It should be noted that the decoding path in the general decoding network and the decoding path in the domain decoding network are concatenated by an end node.

It should be noted that the start node and the end node added in the domain decoding network and the general decoding network may be set to silent (noted as "sil"). The start node and the end node do not affect a decoding result. When decoding the to-be-recognized speech data by using the target decoding network, speech frames of the to-be-recognized speech data pass through the two start nodes and enter the domain decoding network and the general decoding network respectively for decoding. As shown in FIG. 4, speech frames of the to-be-recognized speech data enter the decoding network through a starting character "<s>", jump to the two start nodes and enter the general decoding network and the domain decoding network respectively for decoding. In a case where a candidate path in the general decoding network or the domain decoding network includes an end node, the decoding process jumps from the end node to at least one start node to continue decoding in the general decoding network and/or the domain decoding network until the end of the speech frames, then an ending character "<s>" is outputted so that a serial decoding process is completed.

Figure 5:
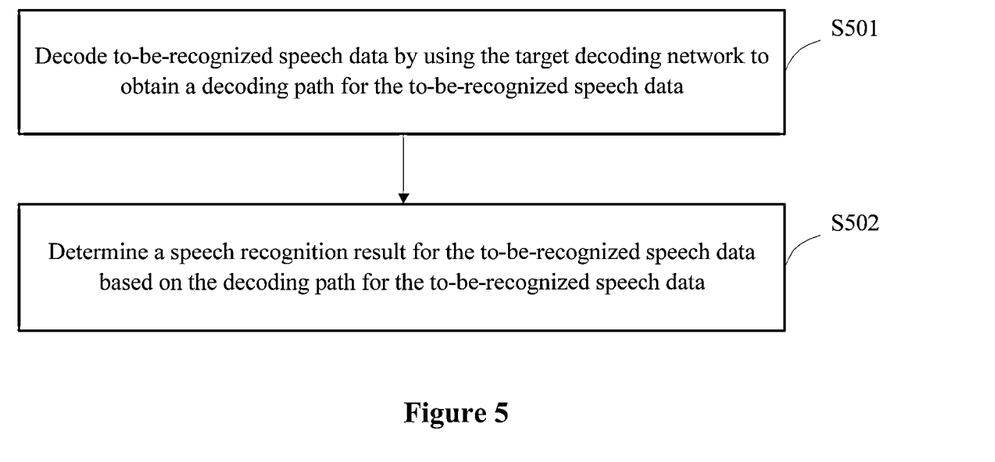
FIG. 5 is a schematic flowchart showing a speech recognition method according to an embodiment of the present disclosure.

On the basis of the foregoing embodiments, a speech recognition method is further provided according to an embodiment of the present disclosure. Referring to FIG. 5, which shows a schematic flowchart of the speech recognition method, the method may include steps S501 to S502.

In step S501, to-be-recognized speech data is decoded by using a target decoding network to obtain a decoding path for the to-be-recognized speech data.

The target decoding network is constructed by using the method for constructing a decoding network provided in the foregoing embodiment.

In one of the implementations, decoding paths of the target decoding network may be presented in a lattice. It should be noted that a lattice is a weighted undirected graph, where each node in the lattice represents an acoustic unit, and each arc contains two weights, i.e., acoustic weight and language weight. Any path from left to right in the lattice constitutes a speech recognition result. A score of an entire path is calculated as a sum of acoustic weights of all edges on the path and the language weight corresponding to the path.

Specifically, a process of decoding the to-be-recognized speech data by using the target decoding network to obtain a decoding path for the to-be-recognized speech data may include: inputting speech frames of the to-be-recognized speech data into the target decoding network sequentially for decoding, to obtain the decoding path for the to-be-recognized speech data. The speech frames of the to-be-recognized speech data enter, respectively via two virtual start nodes in the target decoding network, into the general decoding network and the domain decoding network in the target decoding network for decoding. In a case where a candidate decoding path in the general decoding network or the domain decoding network includes an end node, the process jumps from the end node to at least one start node connected to the end node, entering the general decoding network and/or the domain decoding network to continue decoding until an end of the speech frames.

It should be noted that in a case where a candidate decoding path includes an end node, if a score for a path entering the general decoding network and a score for a path entering the domain decoding network are both greater than or equal to a preset path score threshold, the decoding process jumps from the end node to the two start nodes connected to the end node and enters the general decoding network and the domain decoding network for decoding; if the score for the path entering the general decoding network is greater than or equal to the path score threshold, and the score for the path entering the domain decoding network is smaller than the path score threshold, the decoding process jumps from the end node to the start node created for the general decoding network to enter the general decoding network for decoding; and if the score for the path entering the domain decoding network is greater than or equal to the path score threshold, and the score for the path entering the general decoding network is smaller than the path score threshold, the decoding process jumps from the end node to the start node created for the domain decoding network to enter the domain decoding network for decoding.

In step S502, a speech recognition result for the to-be-recognized speech data is determined based on the decoding path for the to-be-recognized speech data.

The process of determining the speech recognition result for the to-be-recognized speech data based on the decoding path for the to-be-recognized speech data may be implemented in various manners.

In a possible implementation, candidate speech recognition results and scores of the candidate speech recognition results may be obtained based on the decoding path for the to-be-recognized speech data, and a candidate speech recognition result with the highest score is determined as the speech recognition result for the to-be-recognized speech data.

In another possible implementation, the speech recognition result for the to-be-recognized speech data may be determined through a high-ordered language model obtained in advance and the decoding path for the to-be-recognized speech data. Specifically, the decoding path for the to-be-recognized speech data may be inputted into the high-ordered language model obtained in advance to obtain the speech recognition result for the to-be-recognized speech data. It should be noted that the high-ordered language model is obtained by performing interpolation on the universal language model by using the domain language model. The high-ordered language model is capable of selecting the best recognition result from multiple candidate recognition results, as the speech recognition result for the to-be-recognized speech data.

In the speech recognition method provided in the embodiments of the present disclosure, since the target decoding network is obtained by integrating the domain decoding network with the general decoding network, the to-be-recognized speech containing a domain specific term may be accurately recognized by using the target decoding network.

Figure 6:
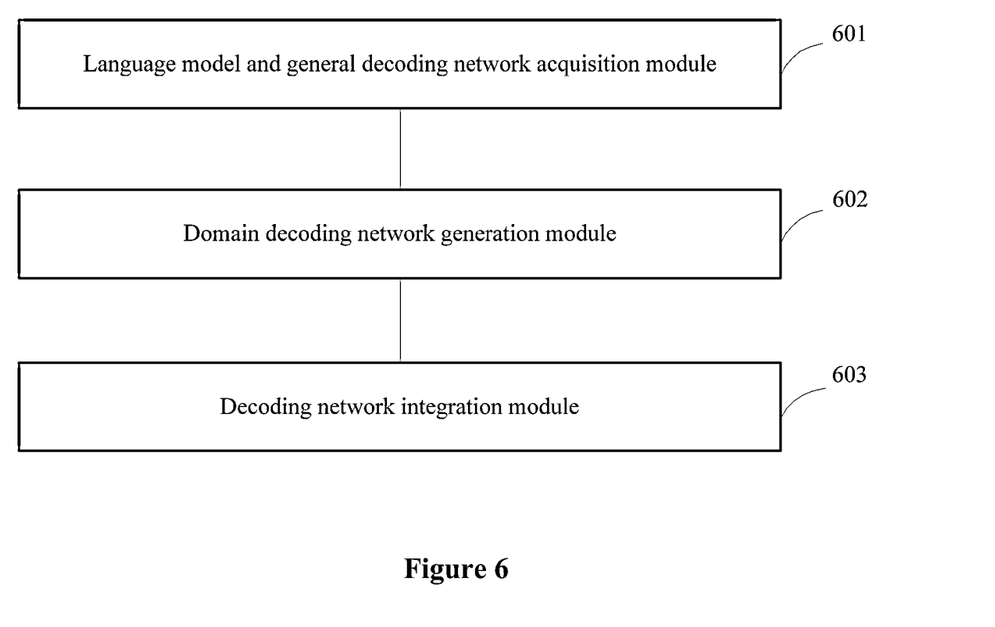
FIG. 6 is a schematic structural diagram showing a device for constructing a decoding network according to an embodiment of the present disclosure.

A device for constructing a decoding network according to an embodiment of the present disclosure is described below. The device for constructing a decoding network and the method for constructing a decoding network may refer to each other. Referring to FIG. 6, which shows a schematic structural diagram of a device for constructing a decoding network according to an embodiment of the present disclosure, the device for constructing a decoding network may include: a language model and general decoding network acquisition module 601, a domain decoding network generation module 602, and a decoding network integration module 603. The language model and general decoding network acquisition module 601 is configured to acquire a universal language model, a domain language model, and a general decoding network generated based on the universal language model. The domain decoding network generation module 602 is configured to generate a domain decoding network based on the universal language model and the domain language model. The decoding network integration module 603 is configured to integrate the domain decoding network with the general decoding network to obtain a target decoding network.

With the device for constructing a decoding network provided in the embodiment of the present disclosure, the target decoding network obtained by integrating the domain decoding network with the general decoding network may accurately recognize not only a general word but also a domain specific term. Compared with the general decoding network, the target decoding network constructed in the embodiment of the present disclosure may improve the accuracy of recognizing a speech containing a domain specific term. In addition, the time and storage resources consumed by the domain decoding network are significantly reduced compared with the time and storage resources consumed by regenerating the general decoding network.

In one of the implementations, the domain decoding network generation module 602 in the device for contrasting a decoding network provided in the foregoing embodiment may include an interpolation sub-module and a domain decoding network generation sub-module. The interpolation sub-module is configured to perform interpolation on the universal language model and the domain language model, where a part on which the interpolation is performed includes all parts in the domain language model and a part in the universal language model which also appears in the domain language model. The domain decoding network generation sub-module is configured to generate the domain decoding network based on the part on which the interpolation is performed.

In one of the implementations, the decoding network integration module 603 in the device for constructing a decoding network provided in the foregoing embodiment is specifically configured to cascade the domain decoding network and the general decoding network to obtain the target decoding network.

In one of the implementations, the decoding network integration module 603 in the device for constructing a decoding network provided in the foregoing embodiment includes: a node adding sub-module and a cascading sub-module. The node adding sub-module is configured to add virtual nodes for each of the general decoding network and the domain decoding network, where the virtual nodes include a start node and an end node. The cascading sub-module is configured to cascade the general decoding network and the domain decoding network by means of the start node and the end node.

In one of the implementations, the cascading sub-module is specifically configured to connect the end node for the general decoding network and the start node for the domain decoding network in a direction from the end node for the general decoding network to the start node for the domain decoding network; and connect the end node for the domain decoding network and the start node for the general decoding network in a direction from the end node for the domain decoding network to the start node for the general decoding network.

Figure 7:
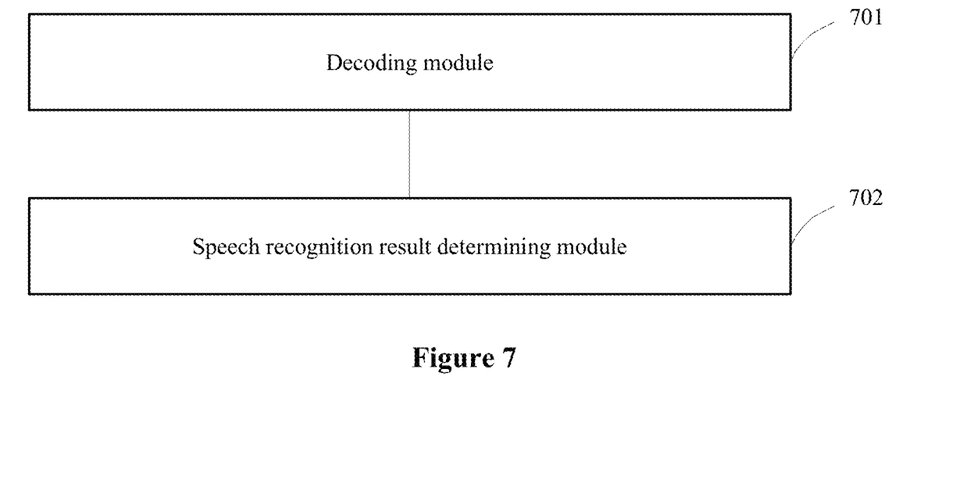
FIG. 7 is a schematic structural diagram showing a speech recognition device according to an embodiment of the present disclosure.

Corresponding to the speech recognition method, a speech recognition device is further provided according to an embodiment of the present disclosure. Referring to FIG. 7, which shows a schematic structural diagram of the speech recognition device, the speech recognition device may include a decoding module 701 and a speech recognition result determining module 702. The decoding module 701 is configured to decode to-be-recognized speech data by using the target decoding network constructed by the device for constructing a decoding network provided in the foregoing embodiment, to obtain a decoding path for the to-be-recognized speech data. The speech recognition result determining module 702 is configured to determine a speech recognition result for the to-be-recognized speech data based on the decoding path for the to-be-recognized speech data.

According to the speech recognition method provided in the embodiment of the present disclosure, the target decoding network is obtained by integrating the domain decoding network with the general decoding network, the target decoding network therefore can accurately recognize the to-be-recognized speech containing a domain specific term.

In one of the implementations, the decoding module 701 in the speech recognition device provided in the foregoing embodiment is specifically configured to determine the speech recognition result for the to-be-recognized speech data based on a high-ordered language model obtained in advance and the decoding path for the to-be-recognized speech data, where the high-ordered language model is obtained by performing interpolation on the universal language model by using the domain language model.

In one of the implementations, the decoding module 701 in the speech recognition device provided in the foregoing embodiment is specifically configured to input speech frames of the to-be-recognized speech data into the target decoding network sequentially for decoding, to obtain the decoding path for the to-be-recognized speech data. The speech frames of the to-be-recognized speech data enter, respectively via two start nodes in the target decoding network, the general decoding network and the domain decoding network in the target decoding network for decoding. In a case where a candidate decoding path in the general decoding network or the domain decoding network includes an end node, the process jumps from the end node to at least one start node connected to the end node, the general decoding network and/or the domain decoding network is entered to continue decoding until an end of the speech frames.

Figure 8:
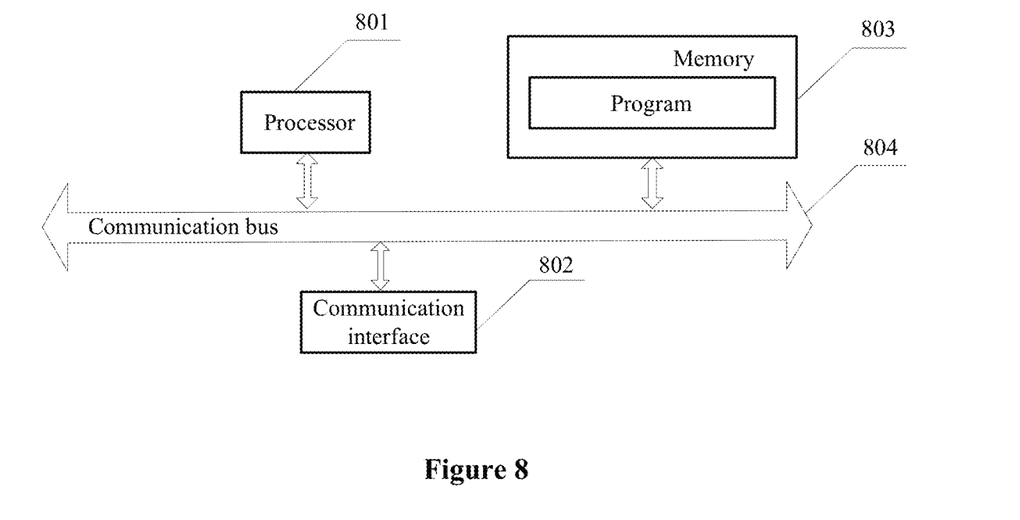
FIG. 8 is a schematic structural diagram showing an apparatus for constructing a decoding network according to an embodiment of the present disclosure.

An apparatus for constructing a decoding network is further provided according to an embodiment of the present disclosure. Referring to FIG. 8, which shows a schematic structural diagram of the apparatus for constructing a decoding network, the apparatus for constructing a decoding network may include: at least one processor 801, at least one communication interface 802, at least one memory 803, and at least one communication bus 804. In the embodiment of the present disclosure, the number of the processor 801, the communication interface 802, the memory 803, and the communication bus 804 is at least one, and the processor 801, the communication interface 802, and the memory 803 communicate with each other via the communication bus 804. The processor 801 may be one central processing unit CPU, an Application Specific Integrated Circuit (ASIC), one or more integrated circuits configured to implement the embodiments of the present disclosure, or the like. The memory 803 may include a high-speed RAM memory, and may further include a non-volatile memory such as at least one disk memory. The memory stores a program, and the program stored in the memory may be called by the processor. The program is used for: acquiring a universal language model, a domain language model, and a general decoding network generated based on the universal language model; generating a domain decoding network based on the domain language model and the universal language model; and integrating the domain decoding network with the general decoding network to obtain a target decoding network.

In alternative embodiments, detailed functions and extended functions of the program may be referred to the above description.

A readable storage medium is further provided according to an embodiment of the present disclosure. The readable storage medium may store a program suitable for execution by a processor, and the program is used for: acquiring a universal language model, a domain language model, and a general decoding network generated based on the universal language model; generating a domain decoding network based on the domain language model and the universal language model; and integrating the domain decoding network with the general decoding network to obtain a target decoding network.

Figure 9:
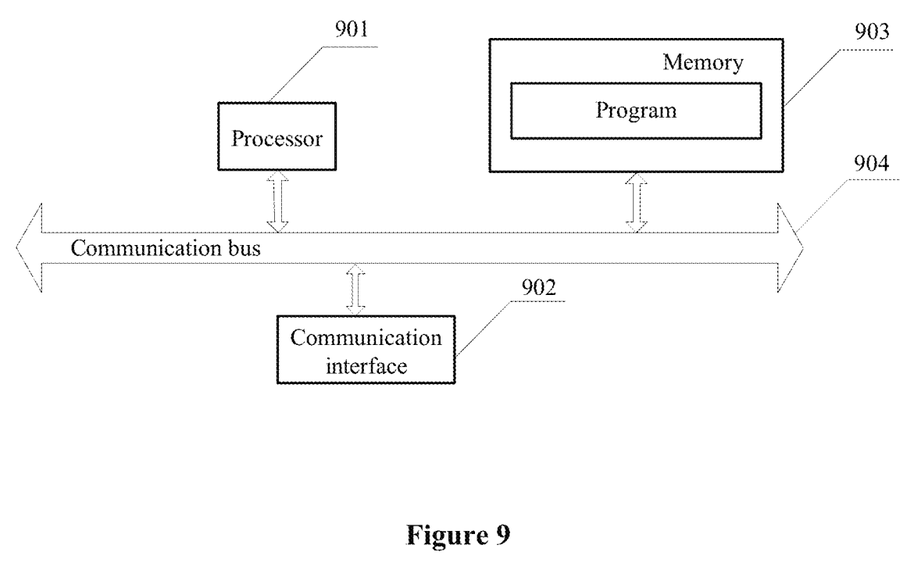
FIG. 9 is a schematic structural diagram showing a speech recognition apparatus according to an embodiment of the present disclosure.

A speech recognition apparatus is further provided according to an embodiment of the present disclosure. Referring to FIG. 9, which shows a schematic structural diagram of the speech recognition apparatus, the speech recognition apparatus may include: at least one processor 901, at least one communication interface 902, at least one memory 903, and at least one communication bus 904. In the embodiment of the present disclosure, the number of the processor 901, the communication interface 902, the memory 903, and the communication bus 904 is at least one, and the processor 901, the communication interface 902, and the memory 903 communicate with each other via the communication bus 904. The processor 901 may be one central processing unit CPU, an Application Specific Integrated Circuit (ASIC), one or more integrated circuits configured to implement the embodiments of the present disclosure, or the like. The memory 903 may include a high-speed RAM memory, and may further include a non-volatile memory such as at least one magnetic disk memory. The memory stores a program, and the program stored in the memory may be called by the processor. The program is used for: decoding to-be-recognized speech data by using a target decoding network constructed by using the method for constructing a decoding network according to the foregoing embodiments, to obtain a decoding path for the to-be-recognized speech data; and determining a speech recognition result for the to-be-recognized speech data based on the decoding path for the to-be-recognized speech data.

In alternative embodiments, detailed functions and extended functions of the program may be referred to the above description.

A readable storage medium is further provided according to an embodiment of the present disclosure. The readable storage medium may store a program suitable for execution by a processor, and the program is used for: decoding to-be-recognized speech data by using a target decoding network constructed by using the method for constructing a decoding network according to the foregoing embodiments, to obtain a decoding path for the to-be-recognized speech data; and determining a speech recognition result for the to-be-recognized speech data based on the decoding path for the to-be-recognized speech data.

Finally, it should be noted that the relationship terms such as "first", "second" and the like are used herein merely to distinguish one entity or operation from another, rather than to necessitate or imply existence of the actual relationship or order of the entities or operations. Moreover, terms "include", "comprise" or any other variants thereof are intended to be non-exclusive. Therefore, a process, method, article or device including a series of elements includes not only these elements but also elements that are not enumerated, or elements that are inherent to the process, method, article or device. Unless expressively limited otherwise, a process, method, article or device limited by "comprising/including a(n) . . . " does not exclude existence of another identical element in such process, method, article or device.

The embodiments in this specification are described in a progressive manner. Each embodiment focuses on any difference from others, and the same or similar parts among the embodiments can be referred to each other.

Those skilled in the art can implement or practice the present disclosure based on the above description of the disclosed embodiments. Various modifications to these embodiments are obvious to those skilled in the art. The general principles defined in the present disclosure may be implemented in other embodiments without departing from the spirit and scope of the present disclosure. Therefore, the present disclosure should not be limited to the embodiments disclosed herein, but conforms to the widest scope consistent with the principle and novel features disclosed in the specification.

What is claimed is:

1. A method for constructing a decoding network, the method comprising:
  acquiring a universal language model, a domain language model, and a general decoding network generated based on the universal language model;
  generating a domain decoding network based on the domain language model and the universal language model, the generating the domain decoding network based on the domain language model and the universal language model comprises:
    performing interpolation on the universal language model and the domain language model, wherein a part on which the interpolation is performed comprises all parts in the domain language model and a part in the universal language model which also appears in the domain language model; and
    generating the domain decoding network based on the part on which the interpolation is performed; and
  integrating the domain decoding network with the general decoding network to obtain a target decoding network.

2. The method for constructing a decoding network according to claim 1, wherein the integrating the domain decoding network with the general decoding network to obtain a target decoding network comprises:
  cascading the domain decoding network and the general decoding network to obtain the target decoding network.

3. The method for constructing a decoding network according to claim 2, wherein the cascading the domain decoding network and the general decoding network comprises:
  adding virtual nodes for each of the general decoding network and the domain decoding network, wherein the virtual nodes comprise a start node and an end node; and
  cascading the general decoding network and the domain decoding network by means of the start node and the end node.

4. The method for constructing a decoding network according to claim 3, wherein the cascading the general decoding network and the domain decoding network by means of the start node and the end node comprises:
  connecting the end node for the general decoding network and the start node for the domain decoding network in a direction from the end node for the general decoding network to the start node for the domain decoding network; and
  connecting the end node for the domain decoding network and the start node for the general decoding network in a direction from the end node for the domain decoding network to the start node for the general decoding network.

5. A speech recognition method, comprising:
  decoding to-be-recognized speech data by using a target decoding network to obtain a decoding path for the to-be-recognized speech data, wherein the target decoding network is constructed by using the method for constructing a decoding network according to claim 1; and
  determining a speech recognition result for the to-be-recognized speech data based on the decoding path for the to-be-recognized speech data.

6. The speech recognition method according to claim 5, wherein the determining a speech recognition result for the to-be-recognized speech data based on the decoding path for the to-be-recognized speech data comprises:
  determining the speech recognition result for the to-be-recognized speech data based on a high-ordered language model obtained in advance and the decoding path for the to-be-recognized speech data, wherein the high-ordered language model is obtained by performing interpolation on the universal language model by using the domain language model.

7. The speech recognition method according to claim 5, wherein a process of decoding to-be-recognized speech data by using a target decoding network to obtain a decoding path for the to-be-recognized speech data comprises:
  inputting speech frames of the to-be-recognized speech data into the target decoding network sequentially for decoding, to obtain the decoding path for the to-be-recognized speech data, wherein
  the speech frames of the to-be-recognized speech data enter, respectively via two start nodes in the target decoding network, the general decoding network and the domain decoding network in the target decoding network for decoding, and
  in a case where a candidate decoding path in the general decoding network or the domain decoding network comprises an end node, the process jumps from the end node to at least one start node connected to the end node, the general decoding network and/or the domain decoding network is entered to continue decoding until an end of the speech frames.

8. A speech recognition apparatus, comprising:
a memory configured to store a program; and
a processor configured to execute the program to perform the speech recognition method according to claim 5.

9. A non-transitory computer-readable storage medium storing a computer program, wherein the computer program, when being executed by a processor, causes the processor to perform the speech recognition method according to claim 5.

10. An apparatus for constructing a decoding network, the apparatus comprising:
a memory configured to store a program; and
a processor configured to execute the program to perform the method for constructing a decoding network according to claim 1.

11. A non-transitory computer-readable storage medium storing a computer program, wherein the computer program, when being executed by a processor, causes the processor to perform the method for constructing a decoding network according to claim 1.

12. A device for constructing a decoding network, the device comprising a processor to:
acquire a universal language model, a domain language model, and a general decoding network generated based on the universal language model;
generate a domain decoding network based on the universal language model and the domain language model;
perform interpolation on the universal language model and the domain language model, wherein a part on which the interpolation is performed comprises all parts in the domain language model and a part in the universal language model which also appears in the domain language model;
generate the domain decoding network based on the part on which the interpolation is performed; and
integrate the domain decoding network with the general decoding network to obtain a target decoding network.

13. The device for constructing a decoding network according to claim 12, wherein the processor is further configured to cascade the domain decoding network and the general decoding network to obtain the target decoding network.

14. A speech recognition device, the device comprising a processor to:
decode to-be-recognized speech data by using a target decoding network to obtain a decoding path for the to-be-recognized speech data, wherein the target decoding network is constructed by the device for constructing a decoding network according to claim 12; and
determine a speech recognition result for the to-be-recognized speech data based on the decoding path for the to-be-recognized speech data.

* * * * *